US012790668B2

(12) United States Patent
Shiratori et al.

(10) Patent No.: US 12,790,668 B2
(45) Date of Patent: Nov. 10, 2026

(54) ALLOY, ALLOY POWDER, ALLOY MEMBER, AND COMPOSITE MEMBER

(71) Applicant: PROTERIAL, LTD., Tokyo (JP)

(72) Inventors: Hiroshi Shiratori, Tokyo (JP); Shuho Koseki, Tokyo (JP); Kousuke Kuwabara, Tokyo (JP); Noriyuki Nozawa, Tokyo (JP); Shinya Okamoto, Tokyo (JP); Toshimi Miyagi, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 21 days.

(21) Appl. No.: 18/861,977

(22) PCT Filed: May 1, 2023

(86) PCT No.: PCT/JP2023/017075
§ 371 (c)(1),
(2) Date: Oct. 31, 2024

(87) PCT Pub. No.: WO2023/214567
PCT Pub. Date: Nov. 9, 2023

(65) Prior Publication Data

US 2025/0154629 A1 May 15, 2025

(30) Foreign Application Priority Data

May 2, 2022 (JP) ................................. 2022-075773

(51) Int. Cl.

| | |
|---|---|
| ***C22C 19/05*** | (2006.01) |
| ***B22F 1/05*** | (2022.01) |
| ***B22F 1/148*** | (2022.01) |
| ***B22F 10/25*** | (2021.01) |
| ***B22F 10/28*** | (2021.01) |
| ***B32B 15/00*** | (2006.01) |
| ***B32B 15/04*** | (2006.01) |

(Continued)

(52) U.S. Cl.
CPC .............. *C22C 19/055* (2013.01); *B22F 1/05* (2022.01); *B22F 1/148* (2022.01); *B22F 10/25* (2021.01); *B22F 10/28* (2021.01); *B32B 15/00* (2013.01); *B32B 15/04* (2013.01); *B32B 15/043* (2013.01); *B33Y 10/00* (2014.12); *B33Y 70/00* (2014.12); *B33Y 70/10* (2020.01); *B33Y 80/00* (2014.12); *C22C 1/0433* (2013.01); *C22C 1/05* (2013.01); *C22C 1/1084* (2013.01); *C22C 19/03* (2013.01); *C22C 19/05* (2013.01); *C22C 19/051* (2013.01); *C22C 19/056* (2013.01); *C22C 19/058* (2013.01); *C22C 29/06* (2013.01); *C22C 29/067* (2013.01); *C22C 32/0047* (2013.01); *C22C 32/0052* (2013.01); *C23C 30/00* (2013.01); *C23C 30/005* (2013.01); *B22F 1/065* (2022.01); *B22F 2301/15* (2013.01); *B22F 2304/10* (2013.01); *B22F 2999/00* (2013.01); *B23K 35/304* (2013.01); *C22C 30/00* (2013.01); *Y10T 428/12931* (2015.01); *Y10T 428/12937* (2015.01); *Y10T 428/12944* (2015.01); *Y10T 428/28* (2015.01); *Y10T 428/298* (2015.01)

(58) Field of Classification Search
CPC . C22C 30/00; C22C 32/0047; C22C 32/0052; C22C 1/0433; C22C 1/05; C22C 1/1084; C22C 19/055; C22C 19/056; C22C 19/03; C22C 19/051; C22C 19/05; C22C 19/058; C22C 29/06; C22C 29/067; B22F 1/05; B22F 1/148; B22F 1/065; B22F 10/25; B22F 10/28; B22F 2301/15; B22F 2304/10; B22F 2999/00; B33Y 70/00; B33Y 70/10; B33Y 80/00; B23K 35/304; C23C 30/00; C23C 30/005; B32B 15/00; B32B 15/04; B32B 15/043; Y10T 428/12931; Y10T 428/12944; Y10T 428/12937; Y10T 428/29; Y10T 428/298
See application file for complete search history.

(56) References Cited

U.S. PATENT DOCUMENTS

2013/0048701 A1* 2/2013 Mirchandani ........... C23C 26/00 228/121
2016/0144468 A1 5/2016 Nam
(Continued)

FOREIGN PATENT DOCUMENTS

| | | | |
|---|---|---|---|
| JP | 2017501890 | A | 1/2017 |
| WO | 2021201118 | A1 | 10/2021 |

OTHER PUBLICATIONS

Amouyal et al., "Segregation of tungsten at gamma prime (L12)/gamma (FCC) interfaces in a Ni-based superalloy: An atom-probe tomographic and first-principles study" in App. Phys. Lett. 93, (Nov. 2008) 201905 (four pages). (Year: 2008).*
(Continued)

*Primary Examiner* — Michael E. La Villa
(74) *Attorney, Agent, or Firm* — Rothwell, Figg, Ernst & Manbeck, P.C.

(57) ABSTRACT

Provided are an alloy having high hardness at high temperatures and high crack resistance, a powder consisting of the alloy, and an alloy member and a composite member including the alloy. The alloy includes, in % by mass, Cr at 10% to 20%, C at 1.0% to 2.5%, Ti at 3% to 8%, either or both of Nb and Ta at 8% to 15% in total, B at less than 0.5%, Al at 2% or less, Mo at 8% or less, W at 8% or less, a total of Mo and W being less than 10%, and a balance consisting of Ni and inevitable impurities, wherein a ratio of a total number of Ti, Nb, and Ta atoms to a number of C atoms is more than 1.5.

9 Claims, 16 Drawing Sheets

(51) Int. Cl.

| | |
|---|---|
| ***B33Y 10/00*** | (2015.01) |
| ***B33Y 70/00*** | (2020.01) |
| ***B33Y 70/10*** | (2020.01) |
| ***B33Y 80/00*** | (2015.01) |
| ***C22C 1/04*** | (2023.01) |
| ***C22C 1/05*** | (2023.01) |
| ***C22C 1/10*** | (2023.01) |
| ***C22C 19/03*** | (2006.01) |
| ***C22C 29/06*** | (2006.01) |
| ***C22C 32/00*** | (2006.01) |
| ***C23C 30/00*** | (2006.01) |
| *B22F 1/065* | (2022.01) |
| *B23K 35/30* | (2006.01) |
| *C22C 30/00* | (2006.01) |

(56) References Cited

U.S. PATENT DOCUMENTS

2021/0404035 A1* 12/2021 Vecchio .................. C22C 19/05
2022/0364207 A1 11/2022 Shiratori et al.

OTHER PUBLICATIONS

Islam, et al., "Investigation of pressure effects on binary carbides ZC . . ." in Physica B 713 (May 2025) 417387 (14 pages). (Year: 2025).*

International Search Report and Written Opinion issued in International Application No. PCT/JP2023/017075, dated Jun. 13, 2023 (8 pages).

* cited by examiner

ALLOY, ALLOY POWDER, ALLOY MEMBER, AND COMPOSITE MEMBER

CROSS REFERENCE TO RELATED APPLICATION(S)

This application is a 35 U.S.C. 371 National Phase Entry Application from PCT/JP2023/017075, filed May 1, 2023, which claims the benefit of Japanese Patent Application No. 2022-075773, filed on May 2, 2022, the disclosures of which are incorporated herein in their entirety by reference.

TECHNICAL FIELD

The present invention relates to an alloy, an alloy powder, an alloy member, and a composite member.

BACKGROUND

Cemented carbide is used in various applications, such as cutting tools and warm or hot forging dies. For example, Patent Literature 1 describes a method for producing a cutting tool having a cutting part consisting of a WC-Co based cemented carbide containing tungsten carbide (WC) and cobalt (Co) as main components.

Patent Literature 2 describes an alloy that has excellent corrosion resistance, wear resistance, and crack resistance and is suitable for an additive manufacturing method and the like. The alloy described in Patent Literature 2 contains, in % by mass, Cr: 18% to 22%, Mo: 18% to 28%, Ta: 1.5% to 57%, C: 1.0% to 2.5%, Nb: 0% to 42%, Ti: 0% to 15%, V: 0% to 27%, Zr: 0% to 29%, and the balance consisting of Ni and inevitable impurities, where a molar ratio of (Ta+0.7Nb+Ti+0.6V+Zr)/C=0.5 to 1.5 is satisfied.

SUMMARY

Technical Problem

Depending on the application, cemented carbide is sometimes desired to have high hardness at high temperatures. Cemented carbide is also desired to be easily fabricated by an additive manufacturing method. The additive manufacturing method involves melting and solidifying metallic materials, which results in significant thermal stress. Therefore, it is desirable for cemented carbide to have high resistance to cracking due to thermal stress. Accordingly, the present invention provides an alloy having high hardness at high temperatures and high crack resistance even when used in the additive manufacturing method, a powder consisting of this alloy, and an alloy member and a composite member including this alloy.

Solution to Problem

According to the first aspect, there is provided an alloy including, in % by mass, Cr at 10% to 20%, C at 1.0% to 2.5%, Ti at 3% to 8%, either or both of Nb and Ta at 8% to 15% in total, B at less than 0.5%, Al at 2% or less, Mo at 8% or less, W at 8% or less, wherein a total of Mo and W is less than 10%, and a balance consisting of Ni and inevitable impurities, wherein a ratio of a total number of Ti, Nb, and Ta atoms to a number of C atoms is more than 1.5.

According to the second aspect, there is provided an alloy powder including, in % by mass, Cr at 10% to 20%, C at 1.0% to 2.5%, Ti at 3% to 8%, either or both of Nb and Ta at 8% to 15% in total, B at less than 0.5%, Al at 2% or less, Mo at 8% or less, W at 8% or less, wherein a total of Mo and W is less than 10%, and a balance consisting of Ni and inevitable impurities, wherein a ratio of a total number of Ti, Nb, and Ta atoms to a number of C atoms is more than 1.5.

According to the third aspect, there is provided an alloy member at least partially including the alloy of the first aspect.

According to the fourth aspect, there is provided a composite member including a substrate and a stacked alloy layer on the substrate, wherein the alloy layer includes the alloy of the first aspect.

According to the fifth aspect, there is provide a die including a substrate and a stacked alloy layer on the substrate, wherein the alloy layer includes the alloy of the first aspect.

Advantageous Effects of Invention

The present invention can provide an alloy having high hardness at high temperatures and high crack resistance, a powder consisting of this alloy, and an alloy member and a composite member including this alloy.

DETAILED DESCRIPTION

Figure 1:
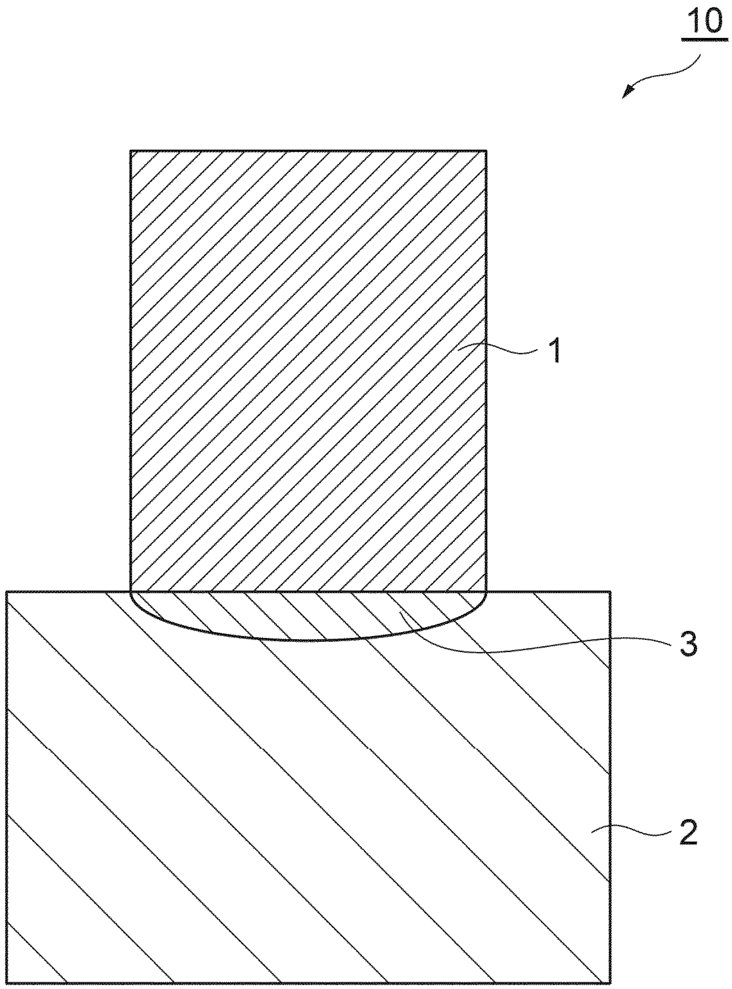
FIG. 1 is a cross-sectional view schematically illustrating an example of a composite member according to one embodiment.

An alloy according to one embodiment of the present invention, and an alloy member, an alloy powder, and a composite member including the same are described below.

A numerical range expressed herein using the term "to" includes the respective numerical values described before and after the term "to" as the lower limit and the upper limit. The upper limits and the lower limits described before and after the term "to" can be combined arbitrarily. The percentage (%) indicating the content of a metal element means "% by mass."

Alloy

The alloy (Ni-based alloy) according to the embodiment contains, as essential components, Ni, Cr, C, Ti, and at least one of Nb or Ta. The alloy according to the embodiment may contain B, Al, Mo, and W as optional elements. The alloy according to the embodiment contains, in % by mass, Cr at 10% to 20%, C at 1.0% to 2.5%, Ti at 3% to 8%, at least one of Nb or Ta at 8% to 15% in total, B at less than 0.5%, Al at 2% or less, Mo at 8% or less, W at 8% or less, and a balance consisting of Ni and inevitable impurities. When the alloy according to the embodiment contains Mo and W, the total amount thereof is less than 10%. In addition, the ratio of the total number of Ti, Nb, and Ta atoms to the number of C atoms contained in the alloy according to the embodiment is more than 1.5. Since B, Al, Mo, and W are optional elements, the lower limits for their amounts in the alloy are 0%.

The chemical composition of the alloy can be analyzed by energy dispersive X-ray spectroscopy (EDX), inductively coupled plasma (ICP) optical emission spectroscopy, or the like.

The components and their amounts contained in the alloy according to the embodiment are described in detail below.

(Cr: 10% to 20%)

Cr has the effect of forming a dense oxide film to improve the oxidation resistance of the alloy. A Cr content of 10% or more provides a sufficient effect of improving oxidation resistance. When the Cr content exceeds 20%, a eutectic Cr carbide and/or brittle intermetallic compound is formed, reducing crack resistance. From the viewpoints of oxidation resistance and crack resistance, the Cr content is preferably 10% to 15% and more preferably 10% to 12%.

(C: 1.0% to 2.5%)

C forms a carbide phase, which is described later, in the alloy, thereby improving the wear resistance of the alloy. A C content of 1.0% or more provides a sufficient effect of improving wear resistance. When the C content exceeds 2.5%, an excessive carbide is formed at high temperatures, making it difficult to produce a powder by atomization. From the viewpoints of wear resistance and ease of atomization, the C content is preferably 1.0% to 2.0% and more preferably 1.0% to 1.5%.

(Ti: 3% to 8%)

Ti causes the formation of a γ' phase (preferably a γ' phase and a γ'' phase) described below in the alloy, thereby improving the hardness of the alloy at high temperatures. In addition, because the free energy of formation of Ti carbide is low, Ti forms a fine carbide phase, which improves the wear resistance of the alloy without impairing its crack resistance. When the Ti content is 3% or more, the γ' phase (preferably the γ' phase and the γ'' phase) and the carbide phase can be sufficiently formed. When the Ti content exceeds 8%, it is likely that Ti will be oxidized to $TiO_2$ during the additive manufacturing process, causing melting failure due to $TiO_2$. When the melting failure occurs, this may become the starting point for a crack that occurs during cooling after fabrication. From the viewpoint of further improving the hardness at high temperatures, the Ti content is preferably 4% to 8%, more preferably 5% to 8%, and further preferably 6% to 8%.

(Either or Both of Nb and Ta: 8% to 15%)

Nb and Ta are elements of the same group in the periodic table and have very similar properties. Nb and Ta cause the formation of the γ' phase (preferably the γ' phase and the γ'' phase) to improve the hardness of the alloy at high temperatures and also cause the formation of a fine carbide phase, thereby improving the wear resistance of the alloy without impairing its crack resistance. That is, Nb and Ta can exert the same functions and effects as Ti.

However, since the free energies of formation of Nb carbide and Ta carbide are larger than that of Ti carbide, the effect of Nb and Ta in refining the carbide phase is smaller than that of Ti. Meanwhile, Nb and Ta are less susceptible to oxidation than Ti and are less likely to cause cracking during fabrication than Ti. Considering these, the upper limit of the total content of Nb and Ta is higher than the upper limit of the Ti content. When the total content of either or both of Nb and Ta is 8% or more, the γ' phase (preferably the γ' phase and the γ'' phase) and the carbide phase can be sufficiently formed. When the total content of either or both of Nb and Ta exceeds 15%, it is likely that Nb and/or Ta will form oxides during the additive manufacturing process, causing melting failure due to the oxides. The total content of at least one of Nb or Ta is preferably 9% to 13% and more preferably 10% to 12%, from the viewpoint of hardness at high temperatures and wear resistance.

(Ratio of Total Number of Ti, Nb, and Ta Atoms to Number of C Atoms: More Than 1.5)

The ratio of the total number of Ti, Nb, and Ta atoms to the number of C atoms contained in the alloy shall be greater than 1.5. That is, $(Ti+Nb+Ta)/C>1.5$, wherein Ti, Nb, Ta, and C represent the number of atoms of each element contained in the alloy, is satisfied. When $(Ti+Nb+Ta)/C$ is 1.5 or less, Ti, Nb, and Ta are consumed to form carbides, resulting in insufficient formation of the γ' phase. $(Ti+Nb+Ta)/C$ is preferably more than 1.5 and 2.5 or less, and more preferably more than 1.5 and 2.4 or less. Ti, Nb, and Ta cause the formation of fine γ' phase particles, as well as contribute to the improvement of wear resistance through the formation of carbide particles. It should be noted that the reason why the amount of Ti, Nb, and Ta and the amount of C are specified in terms of the ratio of the number of atoms is that Ti, Nb, and Ta form a carbide with a NaCl-type crystal structure, which contains metal atoms and carbon atoms in a number ratio of 1:1.

(Al: 2% or less)

Al promotes the formation of the γ' phase, or the γ' phase and the γ'' phase, thereby improving the high-temperature hardness of the alloy. When the Al content exceeds 2%, aging treatment after solution treatment is necessary to form the γ' phase, or the γ' phase and the γ'' phase, which increases the time and energy required to produce the alloy. From the viewpoint of promoting the formation of the γ' phase, or the γ' phase and the γ" phase, the Al content is preferably 0.1% to 2%.

(Mo: 8% or Less, W: 8% or Less, Total of Mo and W: Less Than 10%)

Mo and W have a larger atomic radius than Ni and can form a solid solution with the continuous phase (parent phase) described below to strengthen the alloy. Mo and W are elements of the same group in the periodic table, and Mo carbide and W carbide have similar free energies of formation, as well as the same type of crystal structure. Therefore, Mo and W can be used interchangeably, and both Mo and W can be used. Note that the total content of Mo and W shall be less than 10%. When the Mo content exceeds 8%, the W content exceeds 8%, or the total content of Mo and W is 10% or more, a coarse carbide phase is formed, reducing the crack resistance of the alloy. From the viewpoint of crack resistance, the total content of Mo and W is preferably 0% to 5%. From the viewpoints of crack resistance and strength, the total content of Mo and W is more preferably 3% to 5%. More preferably, the W content is 3% to 5%, and the alloy is substantially free of Mo.

(B: Less than 0.5%)

B may be further added to the alloy according to the embodiment. B is believed to contribute to improving the strength of the grain boundaries by acting to improve the electronic structure of the grain boundaries or the like. Therefore, when the alloy material contains B in an amount of more than 0% and less than 0.5%, the mechanical properties of the alloy product in a high-temperature environment can be improved. Furthermore, when the B content is less than 0.5%, the formation of coarse precipitates in the alloy product is prevented or reduced, thereby preventing or reducing deterioration of the mechanical properties of the alloy product in a room-temperature environment.

Furthermore, in this case, when forming an additively manufactured body (shaped article) by an additive manufacturing process or when forming a shaped article by another process, it is possible to prevent or reduce the occurrence of cracks in the shaped article due to the inclusion of B. Furthermore, when the B content is 0.5% or more, coarse particles may be formed, which may deteriorate mechanical properties, particularly elongation, regardless of temperature. For the above reasons, it is preferable that the B content is less than 0.5%.

(Ni and Inevitable Impurities)

In the alloy according to the embodiment, the balance excluding the above-described essential components and optional components consists of Ni and inevitable impurities. It is acceptable for the alloy according to the embodiment to contain impurities that are present in the raw materials, as well as impurities derived from materials, manufacturing equipment, or the like. Specific examples of inevitable impurities include P, S, Sn, As, Pb, N, and O.

The content of each element of inevitable impurities is preferably 1% or less, more preferably 0.1% or less, further preferably 0.01% or less, and particularly preferably equal to or less than the detection limit. For example, the P content is preferably 0.01% or less. The S content is preferably 0.01% or less and more preferably 0.003% or less. The N content is preferably 0.003% or less.

(Structure of Alloy)

The alloy according to the embodiment includes a continuous phase (parent phase) having a face-centered cubic lattice structure and including a γ phase and a γ' phase, and a carbide phase (dispersed phase) having a NaCl-type crystal structure and dispersed in the continuous phase.

The continuous phase is preferably a phase containing metal(s) as the main component(s). Specifically, the continuous phase is preferably a phase containing at least one of Ni, Cr, Ti, Al, Nb, or Ta. The percent by mass of Ni in the continuous phase may be higher than that of any other element contained in the continuous phase. Moreover, it is preferable that the continuous phase has a face-centered cubic (FCC) structure and includes a γ phase and a γ' phase, and it is more preferable that the continuous phase further includes a γ" phase.

The γ phase is a phase in which the atoms constituting the FCC structure are randomly arranged at the vertices and face centers of the crystal lattice. Meanwhile, the γ' phase and the γ" phase are phases in which the atoms constituting the FCC structure are regularly arranged at the vertices and face centers of the crystal lattice, and the γ' phase has an L12 structure, and the γ" phase has a D022 structure, respectively. The γ' and γ" phases increase the high-temperature hardness of the alloy. The average particle sizes of the γ' and γ" phases are 100 nm or less, preferably in a range of 10 nm to 100 nm. The average particle sizes of the γ' and γ" phases can be measured as follows.

A test piece having a thickness of about 100 nm is cut from the polished surface by a microsampling method using a focused ion beam (FIB). This test piece is observed with a scanning transmission electron microscope (STEM) or a transmission electron microscope (TEM) or subjected to elemental mapping performed by energy-dispersive X-ray spectroscopy (EDX). Based on the obtained images, the arithmetic averages of the projected area circle equivalent diameters of 100 or more γ' and γ" phases are calculated to determine the average particle sizes of the γ' and γ" phases.

The carbide phase preferably has a crystal structure of the NaCl type. A carbide with a NaCl-type crystal structure (MC carbides) is hard and can improve the wear resistance of the alloy. The carbide phase preferably has an average particle size of 50 μm or less, more preferably 0.5 μm to 50 μm, and further preferably 1 μm to 30 μm, and particularly preferably 5 μm to 20 μm. The carbide phase having a small particle size, such as 50 μm or less, allows the alloy to have high crack resistance. Furthermore, as fine carbides are dispersed in the continuous phase, voids that occur in areas where the carbide is cracked are less likely to connect with each other than in a case in which a coarse carbide is present. As a result, it can be expected that cracks will be less likely to propagate throughout the entire alloy. The average particle size of the carbide phase can be measured by determining the arithmetic averages of the projected area circle equivalent diameters of 100 or more carbide phases observed under a scanning electron microscope.

The alloy according to the embodiment has high hardness at high temperatures and high crack resistance. The alloy according to the embodiment is suitable for use as a material for an alloy powder used in additive manufacturing methods, an alloy member used at high temperatures, or the like.

(Form of Alloy)

The alloy according to the embodiment may have any form, such as an alloy mass, an alloy member, or an alloy powder, as long as it has the above-described chemical composition. The alloy according to the embodiment may be part of a composite member. Moreover, the alloy according to the embodiment may be a casted product produced by die casting or the like or a pressed product produced by direct rolling or the like, as long as it has the above-described chemical composition.

The alloy mass may be any of ingot, slab, billet, or the like. The alloy mass may have any appropriate shape and size, such as a rectangular parallelepiped shape, a flat plate shape, a columnar shape, a rod shape, or the like, depending on the application or the like. For example, the alloy mass can be produced by a general casting method in which an alloy is melted in a melting furnace, and then the molten metal is poured into a predetermined mold and allowed to solidify. As the melting furnace, a furnace that melts the alloy by converting electrical energy into thermal energy, an electric resistance furnace that uses Joule heat, a low-frequency induction furnace that uses induced current, a high-frequency induction furnace that uses eddy current, or the like can be used.

Alloy Member

An alloy member according to the embodiment includes the above-described alloy according to the embodiment and preferably consists of the above-described alloy according to the embodiment. The alloy member according to the embodiment may be any of an additively manufactured body, a casted product, a pressed product, a forged product, or the like as long as the alloy member has the above-described chemical composition. The additively manufactured body can be produced by an additive manufacturing method using an alloy powder as the material. The pressed product and the forged product can be produced by a method in which an alloy mass is subjected to shaping process and heat treatment or by a method in which a molten metal is shaped directly, processed, and heat treated.

The use and shape of the alloy member according to the embodiment are not particularly limited. The alloy member according to the embodiment can be subjected to appropriate processing, including tempering such as aging treatment, appropriate heat treatment such as annealing, and/or cold working, hot working, and the like, depending on the application of the member and the required mechanical properties.

When the alloy member according to the embodiment is produced as an additively manufactured body, the entire alloy member may be fabricated by the additive manufacturing method, or only a portion of the alloy member may be fabricated by the additive manufacturing method. That is, the alloy member according to the embodiment includes a composite member in which powder welding (metalizing) of an alloy having the above-described chemical composition is applied to a substrate of an alloy having the above-described chemical composition.

The alloy member according to the embodiment may be a member that is required to have high hardness at high temperatures. Examples thereof include cutting tools; warm or hot forging dies; injection molding screws; injection molding cylinders; drilling equipment for oil well plants; valves, couplings, heat exchangers, and pumps for chemical plants; generator turbines; compressor impellers; and aircraft engine blades and disks.

Alloy Powder

An alloy powder according to the embodiment has the same chemical composition as the above-described alloy according to the embodiment. The alloy powder according to the embodiment can be a granular material having an appropriate particle shape, an appropriate particle size, and an appropriate particle size distribution, as long as it has the chemical composition described above. The alloy powder according to the embodiment is highly resistant to thermal stress during melting and solidification; thus, it is suitable as a material for the additive manufacturing method.

The alloy powder according to the embodiment may be composed only of alloy particles having the above-described chemical composition, a powder obtained by mixing alloy particles having the above-described chemical composition with particles having a different chemical composition, or a powder having the above-described chemical composition by an assembly of particles having any chemical composition.

In addition, the alloy powder according to the embodiment may be produced by a mechanical manufacturing method such as mechanical pulverization or mechanical alloying, by a melting and solidifying process such as an atomization method, or by a chemical manufacturing method such as an oxidation-reduction method or an electrolysis method. However, from the viewpoint of using the alloy powder in additive manufacturing, it is preferable to manufacture the alloy powder through a melting and solidification process, by which spherical particles are easily formed.

The alloy powder according to the embodiment may be a granulated powder or a sintered powder. A granulated powder is a powder that has been granulated such that at least some of the particles that constitute the granular material are bonded to each other. A sintered powder is a powder that has been sintered by heat treatment such that at least some of the particles that constitute the granular material are bonded to each other.

From the viewpoint of appropriately adjusting the particle size distribution of secondary particles, it is preferable to produce the sintered powder by a method in which the alloy powder is first made into a granulated powder and then the granulated powder is fired. For example, the following method can be used as the method in which the alloy powder is made into a granulated powder and then fired to obtain a granulated sintered powder.

First, for example, a metal carbide powder and a powder containing the remaining chemical components that constitute the above-described chemical composition are prepared as raw materials. The prepared raw material powders are then wet-mixed with a binder. A hydrocarbon-based binder is preferably used as the binder. Examples of the hydrocarbon-based binder include waxes such as paraffin. The mixture obtained by mixing is spray-dried using a spray dryer such that a granulated powder of the mixture having an average particle size $d_{50}$ of 1.0 μm to 200 μm can be obtained. In the present application, the average particle diameter $d_{50}$ means a particle diameter (median diameter) at a cumulative value of 50% by volume in a volume-based particle size distribution measured by a laser diffraction scattering method.

The granulated powder mixture is then dried so as to degrease the binder. The degreasing temperature may be any temperature at which the binder used can be sufficiently removed within the required time. The degreasing temperature can be, for example, 400° C. to 600° C. The granulated powder of the mixture is degreased and then fired so as to sinter the particles together. The firing temperature depends on the chemical composition but is, for example, 1000° C. or higher. When the firing temperature is set to a high temperature of 1000° C. or more, the density of the sintered article is high, and therefore a sintered powder having a high bulk density suitable for improving the packing density can be obtained.

The fired sintered powder can be naturally cooled, for example, by air cooling, and then classified according to the purpose by sieve classification, dry classification, wet classification, or the like.

The metal carbide powder used as the raw material for the granulated powder preferably has an average particle size $d_{50}$ of 5 μm or less and more preferably 0.1 μm to 1.0 μm. The powder containing the remaining chemical components preferably has an average particle size $d_{50}$ of 0.1 μm to 50.0 μm and more preferably 0.1 μm to 20.0 μm. The binder powder preferably has an average particle size $d_{50}$ of 0.1 μm to 1.0 μm.

When such raw materials are used, as a result of spray drying, it is possible to efficiently obtain a granulated powder in which the particles are well bonded to each other, C is sufficiently dispersed, and the average particle size $d_{50}$ is 1.0 μm to 200 μm. When such granulated powder is fired to form a sintered powder and then classified to have an average particle size $d_{50}$ of 20 μm to 100 μm, an alloy powder having a highly uniform particle size suitable for additive manufacturing methods can be obtained.

By using the method of granulating the alloy powder and firing it to obtain a granulated sintered powder, the particles constituting the granular material can be sufficiently bonded to each other by sintering, while the binder used in the granulation operation can be reliably removed from the granular material. Generally, when the degreased granulated powder is used as it is in the additive manufacturing method based on the directed energy deposition method, the granulated powder is easily crushed while being fed to the fabrication area. In contrast, a granulated sintered powder, in which the particles are firmly bonded together by sintering, can prevent or reduce crushing during additive manufacturing and reduces defects and non-uniformity in the chemical composition during melting and solidification due to oxidation and the inclusion of impurities.

The alloy powder may be subjected to a spheroidization treatment before being used in the additive manufacturing method. The spheroidization treatment may be carried out using a thermal plasma droplet refining (PDR) method, high-temperature heat treatment, or the like. The PDR method is a method in which powder is introduced into plasma and heat-treated at high temperatures. In the PDR method, some or all of the particles constituting the granular material are immediately melted and solidified, resulting in particles that are close to true spheres due to surface tension. The particle surfaces become smoother, allowing the granular material to have higher fluidity, which improves the fabrication accuracy of the additively manufactured body. In addition, defects during melting and solidification and defects in the solidified structure due to non-uniform chemical composition can be reduced.

The alloy powder according to the embodiment can be produced by various atomization methods. The atomization method is a method for producing a granular material by dispersing a molten metal as droplets using the kinetic energy of a medium sprayed at a high pressure and solidifying the droplets. As the atomization method, any of water atomization method, gas atomization method, jet atomization method, or the like can be used.

The water atomization method is a method for producing a metal powder using the kinetic energy of water by spraying high-pressure water as an atomizing medium onto a molten metal flowing down from the bottom of a tundish or the like. Particles produced by the water atomization method tend to be amorphous. This is because water, which is the spray medium in the water atomization method, has a faster cooling rate than those in other atomization methods. However, particles produced by the water atomization method tend to have irregular shapes.

The gas atomization method is a method for producing a metal powder by spraying a high-pressure inert gas, such as nitrogen or argon, or high-pressure air as an atomizing medium onto a molten metal flowing down from the bottom of a tundish or the like. Particles produced by the gas atomization method tend to be spherical. This is because the inert gas and air, which are the atomizing media in the gas atomization method, have a slower cooling rate than those in the water atomization method. It is considered that, since the molten metal converted into droplets by the atomizing medium remains in a liquid state for a relatively long period of time, the spheroidization proceeds due to surface tension.

The jet atomization method is a method for producing a metal powder by spraying a high-speed and high-temperature flame jet as an atomizing medium onto a molten metal flowing down from the bottom of a tundish or the like. As the flame jet, a supersonic combustion flame generated by burning kerosene or the like is used. Therefore, the molten metal is accelerated over a relatively long period of time to become fine particles. Particles produced by the jet atomization method tend to be spherical and have a particle size distribution with a small average particle size.

From the viewpoint of use in the additive manufacturing method, the alloy powder according to the embodiment is preferably manufactured by the gas atomization method. Particles produced by the gas atomization method have high sphericity and high flowability as a granular material. Therefore, the fabrication accuracy of the additively manufactured body can be improved. In addition, defects during melting and solidification and defects in the solidified structure due to non-uniformity in the chemical composition can be reduced.

(Additive Manufacturing Method)

The alloy powder according to the present invention can be used in any suitable type of additive manufacturing method. Generally, additive manufacturing methods for metal materials can be broadly classified into a powder bed fusion (PBF) method and a directed energy deposition (DED) method.

The powder bed fusion (PBF) method is a method in which a metal powder is spread on a substrate to form a powder bed, and the metal powder spread in a target area is irradiated with a beam to be melted and solidified to be fabricated. In the PBF method, three-dimensional additive manufacturing is performed by laminating the powder bed and repeatedly melting and solidifying the metal powder each time two-dimensional fabrication is performed on a powder bed.

Examples of the powder bed fusion (PBF) method include methods using a laser beam as a heat source and methods using an electron beam as a heat source. The methods using laser beams are broadly classified into a selective laser melting (SLM) method and a selective laser sintering (SLS) method. The methods using an electron beam are referred to as selective electron beam melting (SEBM, or simply EBM) methods.

The selective laser melting (SLM) method is a method in which a metal powder is melted or sintered by a laser beam. The selective laser sintering (SLS) method is a method in which a metal powder is sintered by a laser beam. In the SLM and SLS methods using a laser beam, the metal powder is melted and solidified in an inert atmosphere such as nitrogen gas.

The selective electron beam melting (SEBM/EBM) method is a method in which a metal powder is melted using an electron beam as a heat source. The EBM method using an electron beam is carried out by irradiating a metal powder with an electron beam and converting the kinetic energy into heat to melt the metal powder. In the EBM method, electron beam irradiation and melting and solidification of the metal powder are carried out under high vacuum.

The directed energy deposition (DED) method is a method in which a metal powder is delivered to a substrate or an already-fabricated area and irradiated with a beam to melt and solidify, thereby completing fabrication. In the DED method, three-dimensional additive manufacturing is performed by scanning the delivery of the metal powder and the beam irradiation two-dimensionally or three-dimensionally to repeatedly deposit a solidified metal on the already-fabricated area.

The DED method is also referred to as a metal deposition method. Examples of the DED methods include the laser metal deposition (LMD) method, which uses a laser beam as a heat source, and a method that uses an electron beam as a heat source. Among the DED methods, a method that uses a laser beam to apply powder welding to a substrate is also referred to as laser powder welding.

Among the various additive manufacturing methods, the powder bed fusion (PBF) method is advantageous in high shape accuracy of the additively manufactured body. On the other hand, the directed energy deposition (DED) method is advantageous in enabling high-speed fabrication. In particular, among the powder bed fusion (PBF) methods, the powder laser melting (SLM) method allows selective melting and solidification of the metal powder by irradiating a powder bed with a thickness of several tens of μm per layer with a laser having a tiny beam diameter.

(Additive Manufacturing Conditions)

The thickness of one layer during additive manufacturing can be, for example, 0.1 mm to 1.0 mm, and preferably 0.4 mm to 0.5 mm. The first layer of the alloy (including the diffusion layer formed near the interface between the substrate and the alloy) formed on the surface of the substrate (base plate) has a thickness (distance from the interface between the substrate and the alloy to the surface of the first layer of the alloy) of 0.1 mm to 1 mm. The total thickness of the alloy (including the diffusion layer near the interface) is 0.1 mm to 2 mm. The laser beam preferably has a diameter of about 3 mm at the irradiation position. The laser output is preferably 1500 W to 2400 W. The laser scanning speed is preferably 500 mm/min to 1000 mm/min. The powder supply rate is preferably 5 g/min to 15 g/min.

In a case in which the amount of heat input E, which is the density of energy input by laser irradiation for rapid melting of a raw material powder, is too small, the defect rate will increase and, in addition, the supplied powder will not melt, making it difficult to maintain the shape of the manufactured body. On the other hand, in a case in which the amount of heat input E is too large, the base plate or the manufactured body will melt over a wide area centered on the laser irradiation position, making it difficult to maintain the shape of the manufactured body. The amount of heat input E (J/mm) can be calculated from Formula (1) using the laser output P (W) and the laser scanning speed v (mm/min).

$$E=(P/v)\times 60 \tag{1}$$

When using the directed energy deposition (DED) method as the additive manufacturing method, the laser output is preferably 1500 W to 2400 W, the amount of heat input is preferably 100 J/mm to 5000 J/mm (1 kJ/cm to 50 kJ/cm), the amount of powder supply is preferably 0.1 g/cm to 1 g/cm, and the amount of heat input into the powder is preferably 5 kJ/g to 100 kJ/g. Moreover, the carrier gas flow rate is preferably 1 L/mm to 50 L/mm, and the shielding gas flow rate is preferably 1 L/min to 50 L/min.

(Particle Size Distribution of Alloy Powder)

The alloy powder according to the embodiment preferably has an average particle size (median size) $d_{50}$ (hereinafter, appropriately referred to as "average particle size $d_{50}$") in a range of 5 μm to 500 μm, the average particle diameter $d_{50}$ corresponding to a particle size at a cumulative value of 50% by volume in a volume-based particle size distribution measured by a laser diffraction scattering method. In the additive manufacturing method, each powder aggregation in a certain amount is melted and solidified. When the particle size of the alloy powder is too small, the beads will also become small, making them more susceptible to defects such as the interface fracture of beads. On the other hand, when the particle size of the alloy powder is too large, the beads will also become large, making it easier for defects to occur due to uneven cooling rates. However, as long as the average particle size $d_{50}$ is within the range of 5 μm to 500 μm, an additively manufactured body with fewer defects is easily obtained.

However, the optimum particle size and particle size distribution of the alloy powder vary depending on the additive manufacturing method. Therefore, it is preferable to adjust the particle size and particle size distribution of the alloy powder according to the additive manufacturing method. From the viewpoint of use in the powder bed fusion (PBF) method or the directed energy deposition (DED) method, the alloy powder according to this embodiment has an average particle size $d_{50}$ preferably in a range of 10 μm to 250 μm and more preferably in a range of 20 μm to 150 μm.

For example, in the powder laser melting (SLM) method, the average particle size $d_{50}$ is preferably between 10 μm and 60 μm and more preferably between 20 μm and 40 μm. The particle diameter $d_{10}$, corresponding to a particle size at a cumulative value of 10% by volume in the volume-based particle size distribution measured by a laser diffraction scattering method (hereinafter appropriately referred to as "particle diameter $d_{10}$"), is preferably 5 μm to 35 μm. The particle diameter $d_{90}$, corresponding to a particle size at a cumulative value of 90% by volume in the volume-based particle size distribution measured by a laser diffraction scattering method (hereinafter appropriately referred to as "particle diameter $d_{90}$"), is preferably 20 μm to 100 μm.

In the SLM method, when the particle size of a metal powder is less than 10 μm, the granular material will have poor depositability and spreadability, and the powder layered as a powder bed will tend to become uneven. When the particle size exceeds 100 μm, melting by the beam tends to be incomplete, causing defects in the solidified structure and/or increasing surface roughness. With the above particle size distribution, on the other hand, it is easy to form a flat powder bed with a uniform thickness, and it is also easy to repeatedly form the powder bed, making it easier to obtain an additively manufactured body with fewer defects.

In the case of the laser metal deposition (LMD) method or the powder bed type selective electron beam melting (EBM) method, the average particle size $d_{50}$ is preferably 30 μm to 250 μm and more preferably 60 μm to 120 μm. The particle size $d_{10}$ is preferably 15 μm to 100 μm. The particle size $d_{90}$ is preferably 50 μm to 500 μm.

In the LMD method, when the average particle size of the metal powder is small, the flow of the powder transported to a nozzle head is likely to become biased, making it difficult to supply the metal powder to a molten pool stably. When the particle size exceeds approximately 500 μm, the metal powder may cause clogging inside the nozzle head, melting may become incomplete, causing defects in the solidified structure, and the surface roughness may increase. Meanwhile, in the EBM method, when the average particle size of the metal powder is small, a smoke phenomenon is likely to occur. However, with the particle size distribution described above, the supply of the metal powder to the molten pool and the prevention of scattering of the metal powder become favorable, making it easier to obtain an additively manufactured body with high precision.

Composite Member

The composite member according to the embodiment can be obtained by integrating the alloy member having the above-described chemical composition or an alloy layer formed from the alloy powder having the above-described chemical composition with another member. Examples of integration methods include welding, soldering, brazing, mechanical bonding, and diffusion bonding.

FIG. 1 is a cross-sectional view schematically illustrating an example of a composite member according to the embodiment. A composite member 10 shown in FIG. 1 includes a substrate 2 and an alloy layer 1 stacked on the surface of the substrate 2. Such a composite member 10 can be manufactured by the additive manufacturing method using a directed energy deposition (DED) method with the alloy powder.

The alloy layer 1 includes the above-described alloy according to the embodiment and preferably consists of the above-described alloy according to the embodiment. The shape and size of the alloy layer 1 are not particularly limited. In the example shown in FIG. 1, the alloy layer 1 is a columnar layer formed by powder welding on the surface of the substrate 2, but the alloy layer 1 may also be a thin-film coating that covers the surface of the substrate 2 or an additively manufactured body having any three-dimensional shape.

The shape and material of the substrate 2 are not particularly limited. For example, a Fe-based alloy or a Ni-based alloy can be used for the substrate 2. In conventional additive manufacturing methods, the substrate is preheated to reduce thermal stress in order to prevent cracking caused by thermal stress generated by melting and solidifying a raw material powder. Therefore, the substrate conventionally had to have high heat resistance. However, since the alloy layer 1 of the composite member 10 according to the embodiment has high crack resistance, preheating of the substrate 2 is not necessary or the preheating temperature of the substrate 2 can be reduced. Therefore, the substrate 2 of the composite member 10 according to the embodiment does not need to have high heat resistance.

A mixed layer 3 may be formed between the substrate 2 and the alloy layer 1. The mixed layer 3 has a chemical composition intermediate between that of the substrate 2 and that of the alloy layer 1. The mixed layer 3 is formed by diffusion of atoms of the substrate 2 and the alloy layer 1 when the raw material powder is melted and solidified in the additive manufacturing method.

Figure 2:
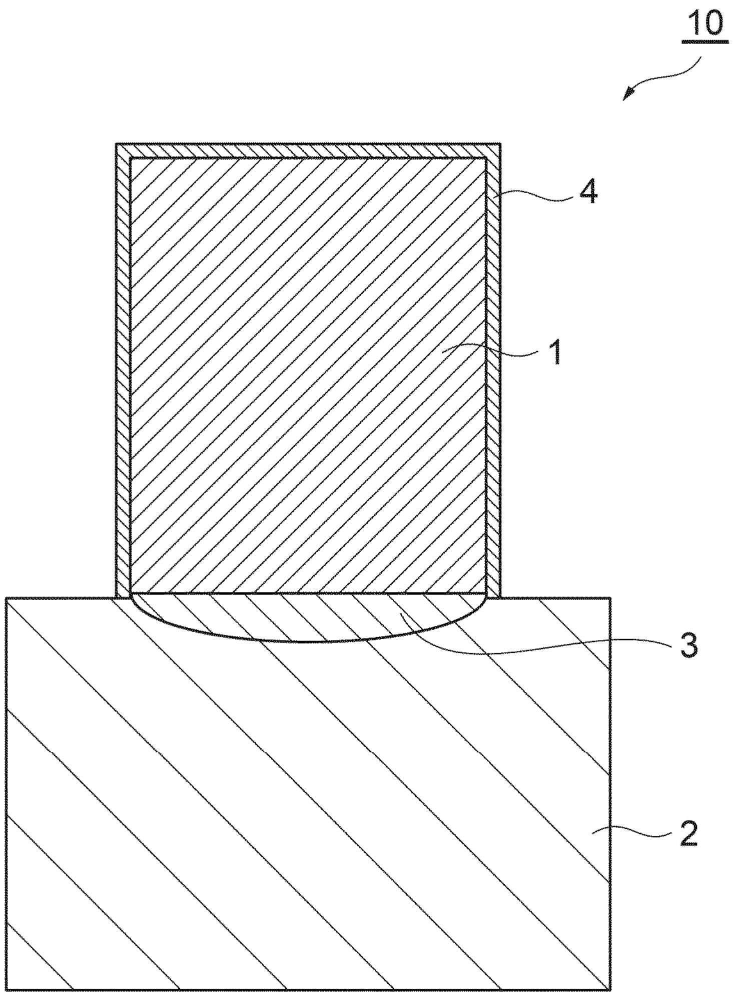
FIG. 2 is a cross-sectional view schematically illustrating an example of a composite member according to one embodiment.
Figure 3:
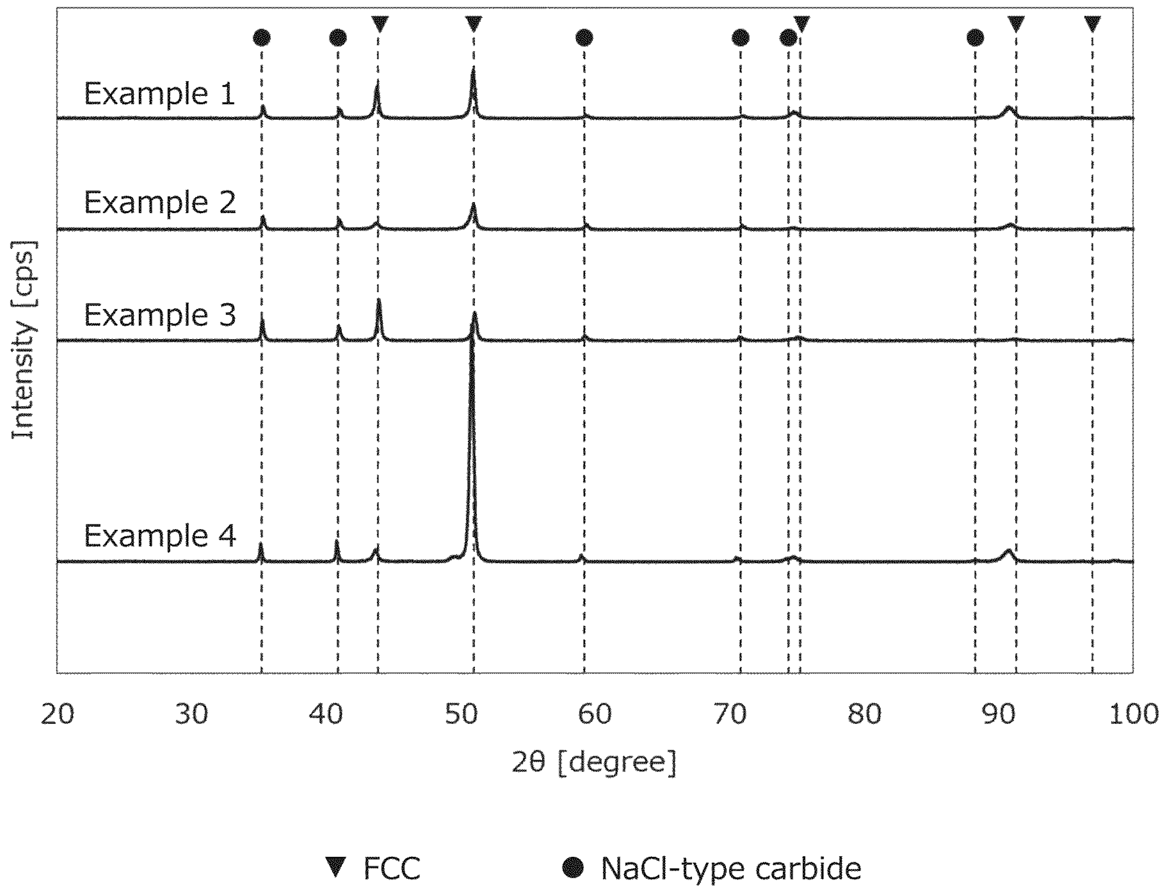
FIG. 3 shows X-ray diffraction (XRD) patterns of the alloys of Examples 1 to 4.
Figure 4:
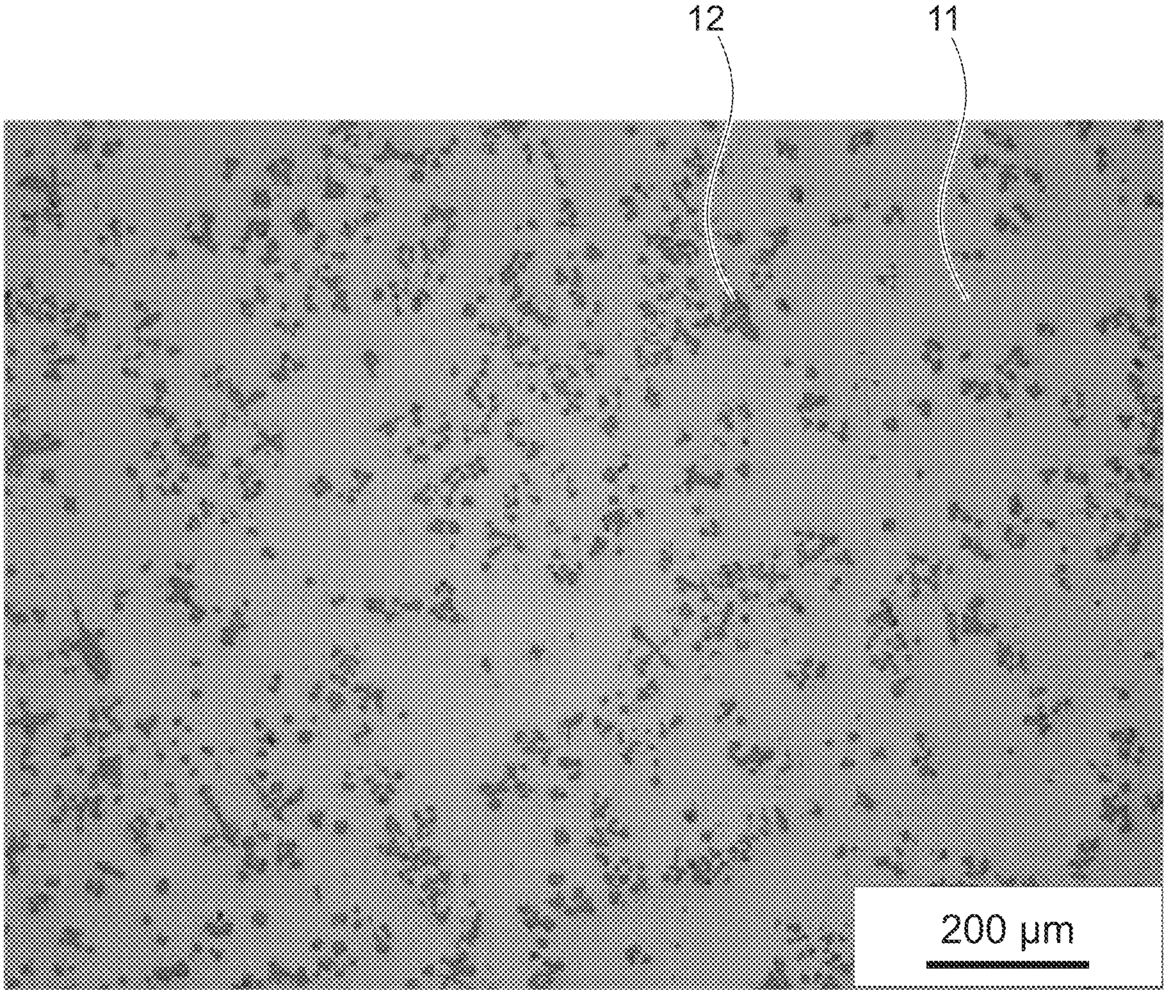
FIG. 4 is an optical microscope image of the alloy of Example 1.
Figure 5:
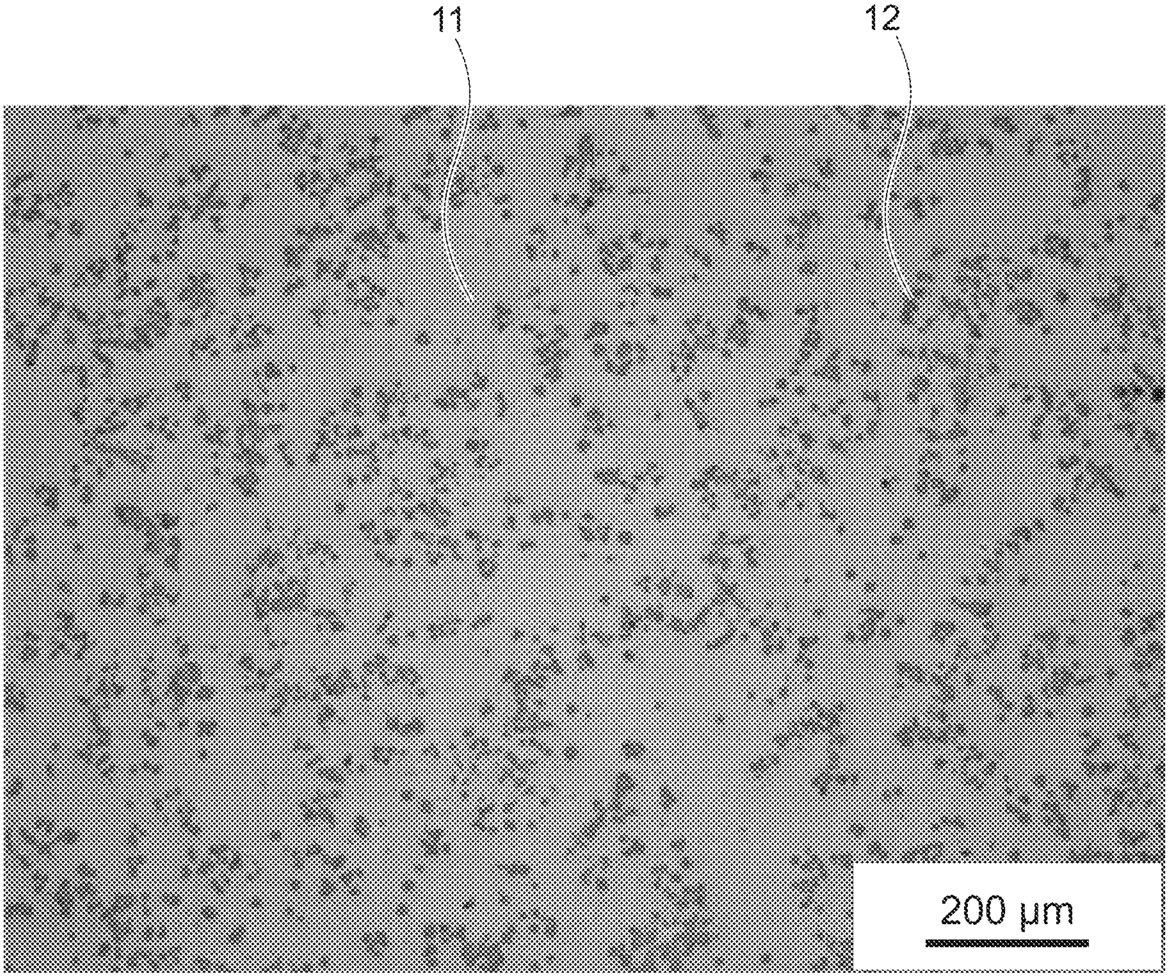
FIG. 5 is an optical microscope image of the alloy of Example 2.
Figure 6:
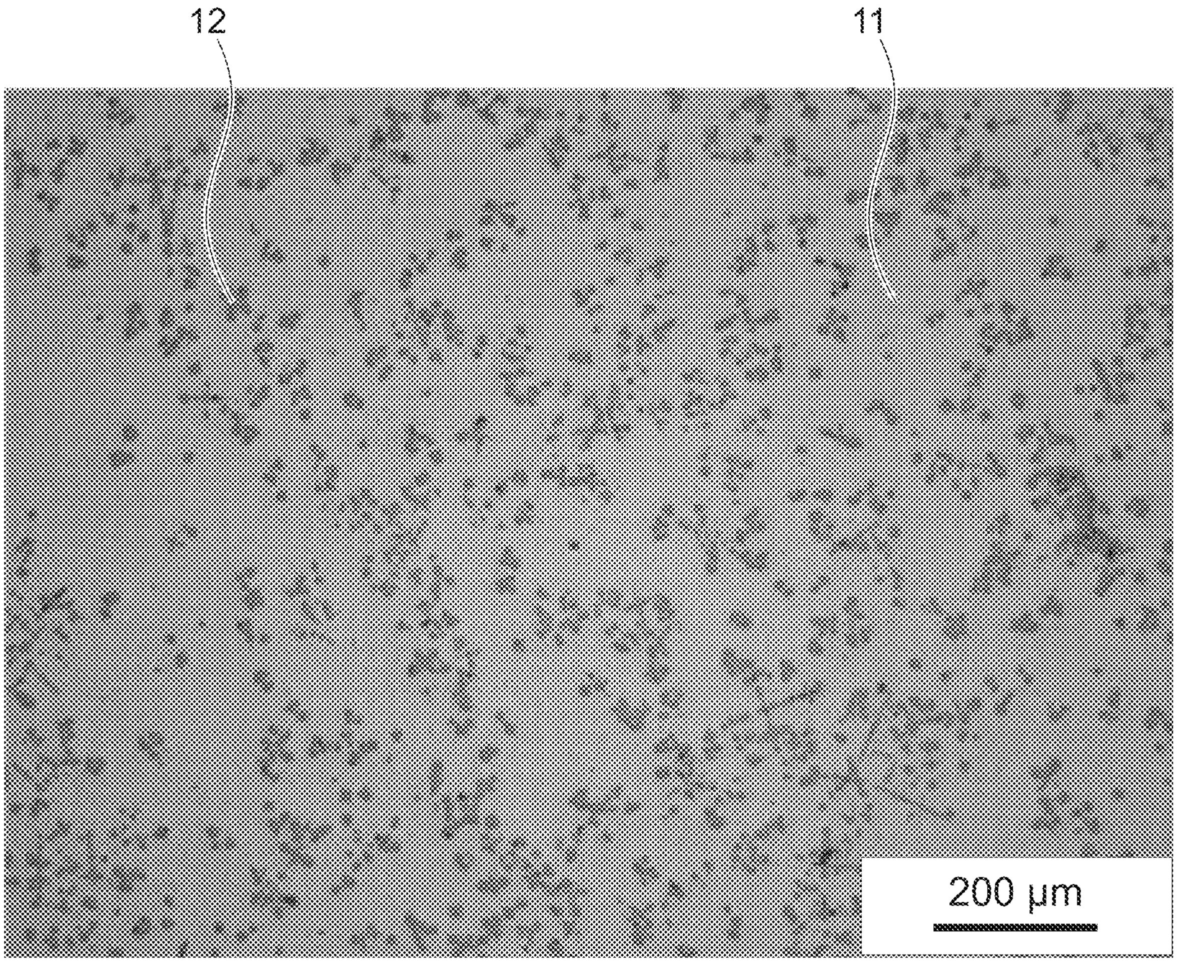
FIG. 6 is an optical microscope image of the alloy of Example 3.
Figure 7:
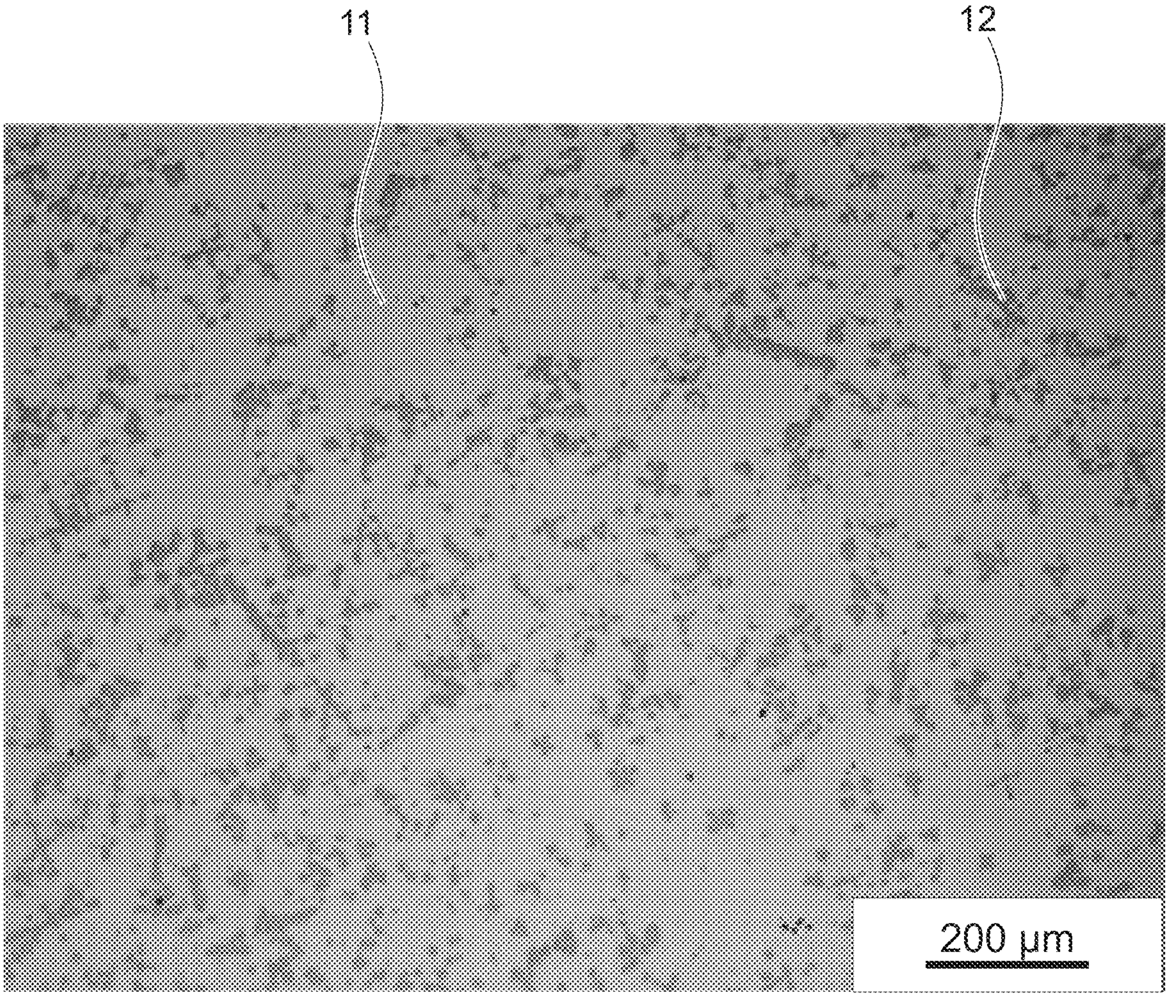
FIG. 7 is an optical microscope image of the alloy of Example 4.

As shown in FIG. 2, the composite member 10 may further include a coating layer 4 formed on the surface of the alloy layer 1. The coating layer 4 can be formed, for example, by a method of nitriding the surface of the alloy layer 1, a chemical vapor deposition (CVD) method, or a physical vapor deposition (PVD) method. The material of the coating layer 4 is not particularly limited, but is preferably, for example, titanium carbide (TiC), titanium nitride (TiN), titanium carbonitride (TiCN), aluminum oxide ($Al_2O_3$), titanium aluminum nitride (TiAlN), or chromium nitride (CrN). When the coating layer 4 is formed on the surface of the alloy layer 1, the wear resistance of the composite member 10 can be improved.

The composite member according to the embodiment may be a member that is required to have high hardness at high temperatures, similar to the above-described alloy member. Examples thereof include cutting tools, warm or hot forging dies, injection molding screws, injection molding cylinders, drilling equipment for oil well plants, valves, couplings, heat exchangers, and pumps for chemical plants, generator turbines, compressor impellers, and aircraft engine blades and disks. A die that has been subjected to powder welding for die repair is also included in examples of the composite member according to the embodiment.

Although the embodiment of the present invention has been described above, the present invention is not limited to the above-described embodiment, and various modifications are possible without departing from the spirit of the present invention. For example, the present invention is not limited to having all of the configurations of the above-described embodiment. It is possible to replace a part of the configuration of one embodiment with another configuration, add a part of the configuration of one embodiment to another embodiment, or omit a part of the configuration of one embodiment.

EXAMPLES

The present invention is specifically described in the following examples. However, these examples are not intended to limit the scope of the present invention.

(1) Preparation of Alloy Mass

Examples 1 to 4

The following alloy raw materials were prepared and weighed so as to have the chemical compositions shown in Table 1.

Cr: Powder with a particle size of 63 μm to 90 μm
Ti: 1-mm to 3-mm crushed particles
Nb: 3-mm to 5-mm crushed particles
W: Powder with a particle size of 50 μm or less
C: Spherical particles with a diameter of 1 mm to 2 mm
Al: Spherical particles with a diameter of 5 mm to 10 mm
Ni: Spherical particles with a diameter of 8 mm to 15 mm

TABLE 1

| | Composition [% by mass] | | | | | | |
|---|---|---|---|---|---|---|---|
| | Cr | Ti | Nb | W | C | Al | Ni |
| Example 1 | 10 | 6 | 10 | 5 | 2 | 0 | Balance |
| Example 2 | 10 | 8 | 10 | 5 | 2 | 0 | Balance |
| Example 3 | 10 | 4 | 10 | 5 | 2 | 1 | Balance |
| Example 4 | 10 | 4 | 15 | 5 | 2 | 0 | Balance |

The weighed raw materials were mixed in an alumina crucible, melted in a high-frequency induction melting furnace, and poured into a water-cooled copper mold, thereby obtaining an alloy mass (ingot) for each Example.

Comparative Example

Additive manufacturing was performed using a WC—Co cemented carbide powder containing Co in an amount of 40% and the balance of WC as a raw material to form a WC—Co cemented carbide-manufactured body on a Ni-based alloy substrate to obtain test pieces. The additive manufacturing was carried out by a laser deposition method using a directed energy deposition method in which the raw material was allowed to adhere in eight passes per layer to a height of 10 mm and approximately 20 layers were stacked. The composition of the Ni-based alloy substrate used and the additive manufacturing conditions were as follows. The additive manufacturing conditions were set such that the amount of heat input to the raw material powder was relatively small to prevent or reduce cracking between the substrate and the manufactured body.

Composition of Ni-Based Alloy Substrate

- C: 0.03%
- Si: 0.08%
- Mn: 0.05%
- P: 0.004%
- S: 0.0002%
- Cr: 18.58%
- Mo: 3.08%
- Co: 0.04%
- Cu: 0.02%
- Al: 0.56%
- Ti: 0.94%
- Fe: 24.19%
- B: 0.0038%
- Ni: Balance Additive Manufacturing Conditions

- Laser output: 1200 W
- Laser beam scanning speed: 100 mm/min
- Amount of heat input: 7.2 kJ/cm
- Amount of powder supply: 0.2 g/cm
- Amount of heat input into powder: 36 kJ/g
- Defocus distance: 20 mm
- Carrier gas flow rate: 5.5 L/mm
- Shielding gas flow rate: 20 L/min
- Side gas flow rate: 10 L/min (2) Elemental Analysis The alloy mass of each Example was subjected to elemental analysis by ICP optical emission spectrometry. The ratio of the total number of Ti, Nb, and Ta atoms to the number of C atoms ((Ti+Nb+Ta)/C) was calculated from the elemental analysis results. Table 2 shows the results.

TABLE 2

| | Composition (measurement value) [% by mass] | | | | | | | |
|---|---|---|---|---|---|---|---|---|
| | Cr | Ti | Nb | W | C | Al | Ni | (Ti + Nb + Ta)/C |
| Example 1 | 10.10 | 5.31 | 8.95 | 4.40 | 1.14 | 0.69 | Balance | 2.18 |
| Example 2 | 10.16 | 6.38 | 10.17 | 3.67 | 1.24 | 0.40 | Balance | 2.35 |
| Example 3 | 10.17 | 3.73 | 9.17 | 4.69 | 1.36 | 1.54 | Balance | 1.56 |
| Example 4 | 10.12 | 3.85 | 14.30 | 4.32 | 1.25 | 0.35 | Balance | 2.25 |

(3) Crystal Structure Analysis

A test piece of a predetermined shape was cut out from the alloy mass of each Example, polished with waterproof emery paper up to No. 1000, and subjected to XRD measurement under the following conditions. Table 3 shows the results.

- Radiation source: Cu
- Tube voltage: 48 kV
- Tube current: 28 mA
- Sampling interval: 0.02°
- Scanning range: 2θ=20° to 100°

In each Example, a main peak attributed to the FCC structure and a peak attributed to NaCl-type carbide were observed.

(4) Alloy Structure Observation

Figure 8:
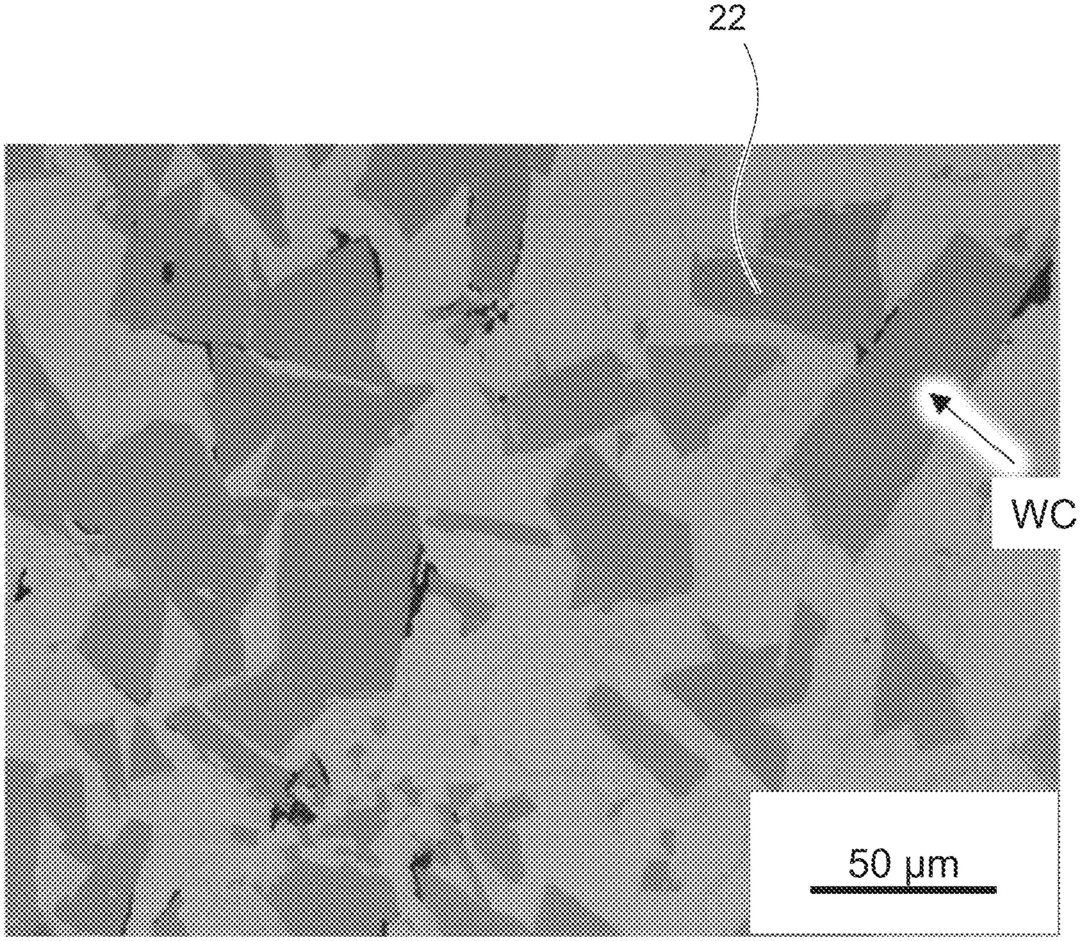
FIG. 8 is an optical microscope image of the alloy of the Comparative Example.

Test pieces of a predetermined shape were cut out from the alloy mass of each Example and the WC—Co cemented carbide-manufactured body of the Comparative Example and observed under an optical microscope and a scanning electron microscope (SEM). FIGS. 4 to 7 show optical microscope images of the alloys of Examples 1 to 4, respectively. FIG. 8 shows an optical microscope image of the alloy of the Comparative Example. FIGS. 10 to 16 show SEM images of the alloys of Examples 1 to 4.

Figure 9:
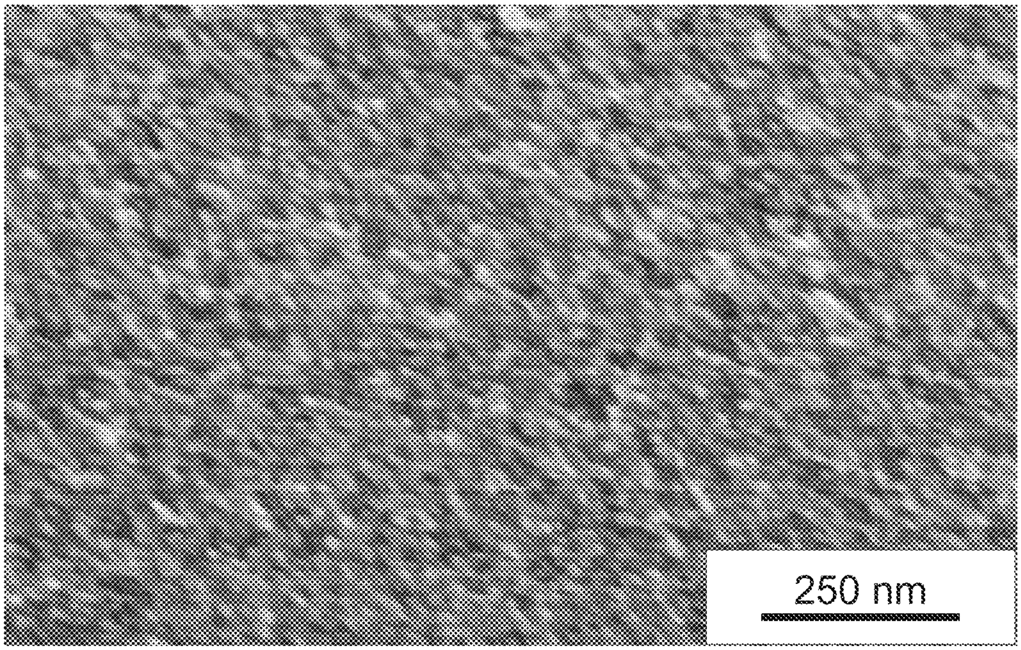
FIG. 9 is a scanning electron microscope (SEM) image of the continuous phase of the alloy of Example 1.
Figure 10:
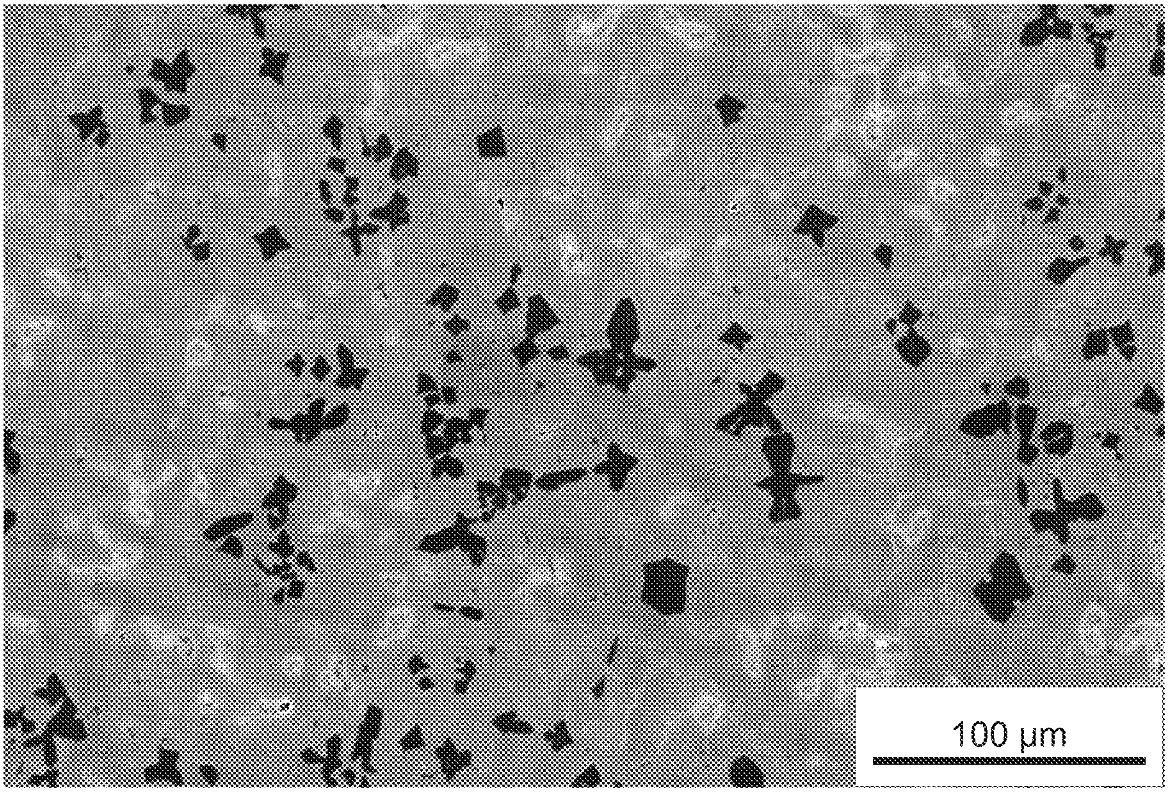
FIG. 10 is an SEM image of the alloy of Example 1.
Figure 11:
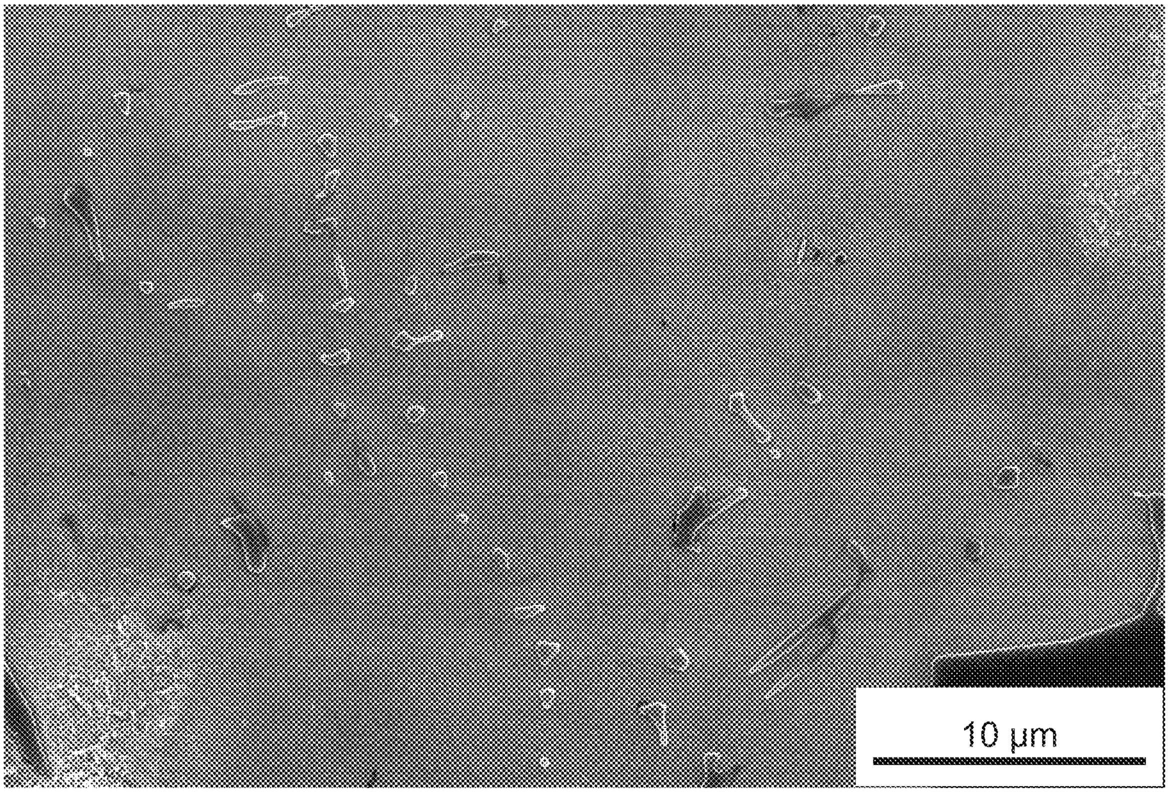
FIG. 11 is an SEM image of the alloy of Example 1.
Figure 12:
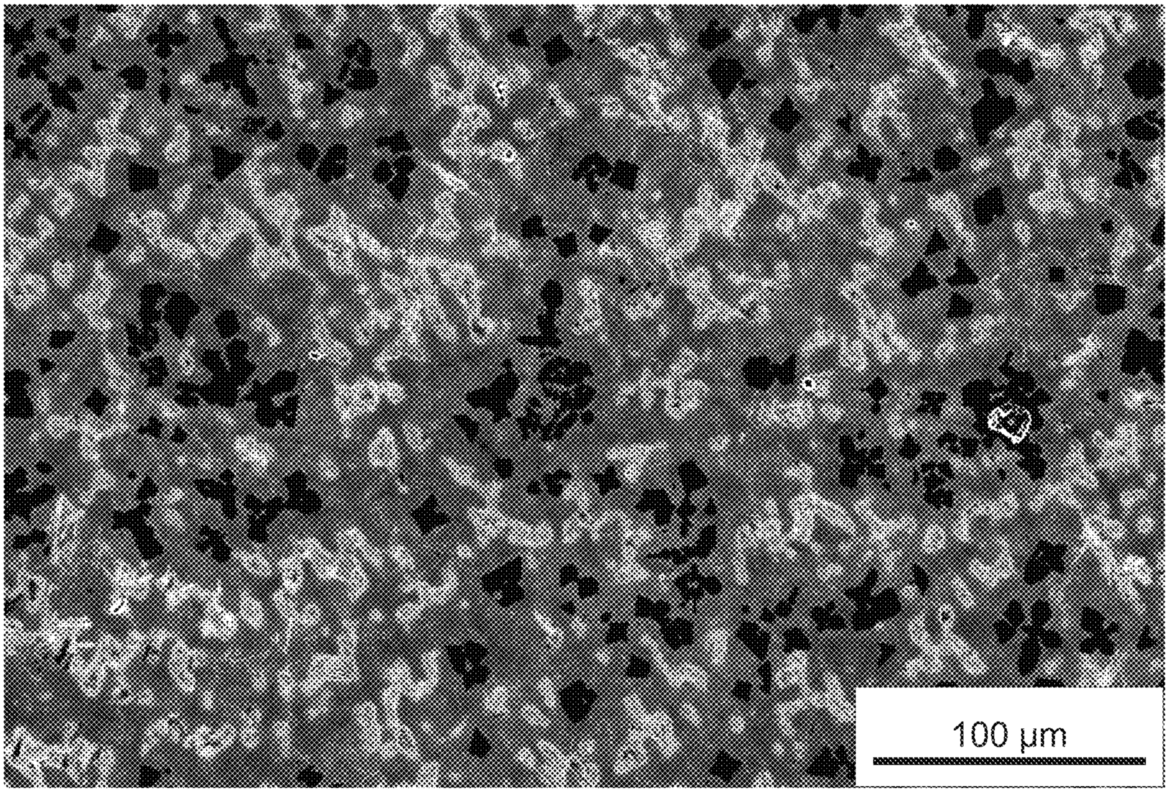
FIG. 12 is an SEM image of the alloy of Example 2.
Figure 13:
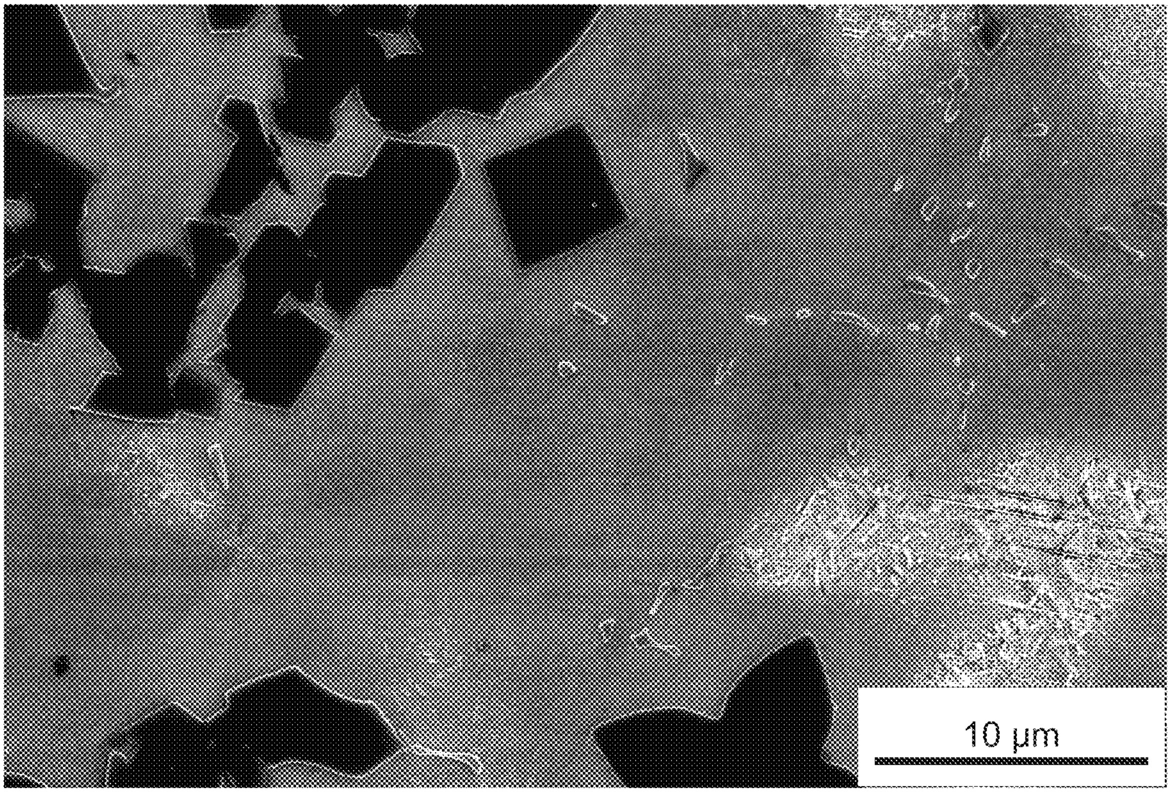
FIG. 13 is an SEM image of the alloy of Example 2.
Figure 14:
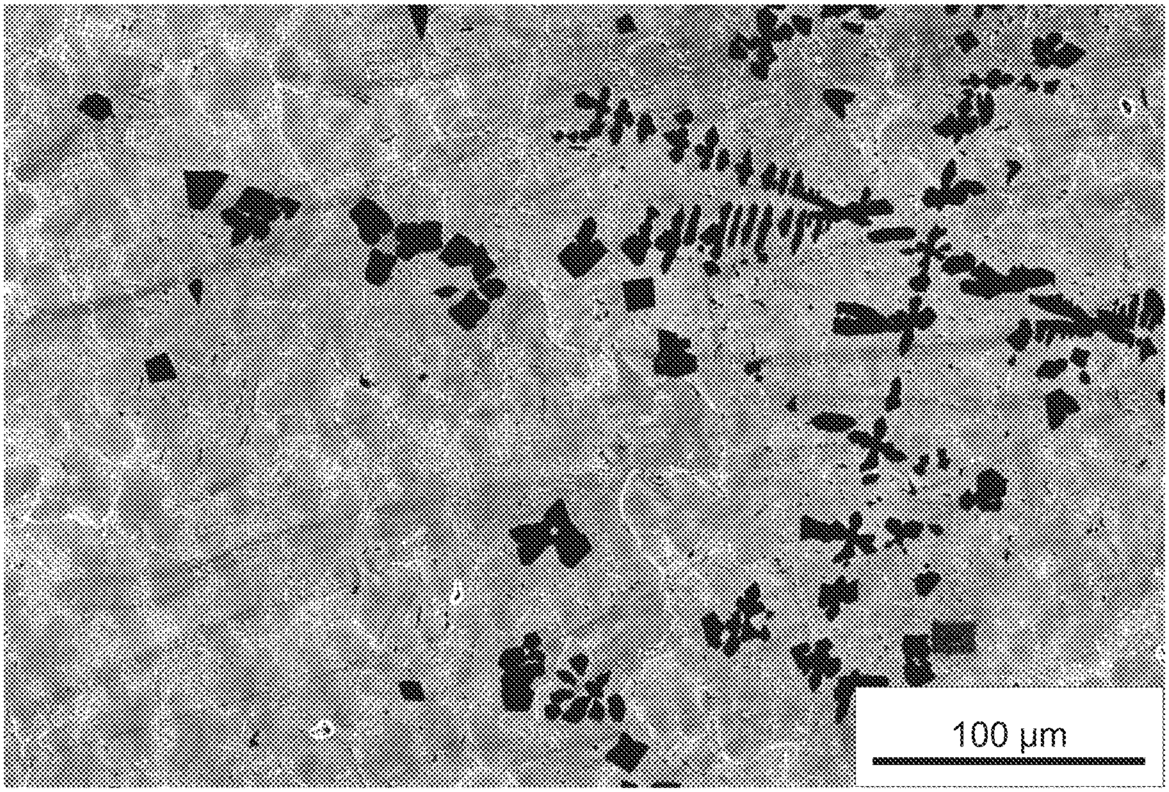
FIG. 14 is an SEM image of the alloy of Example 3.
Figure 15:
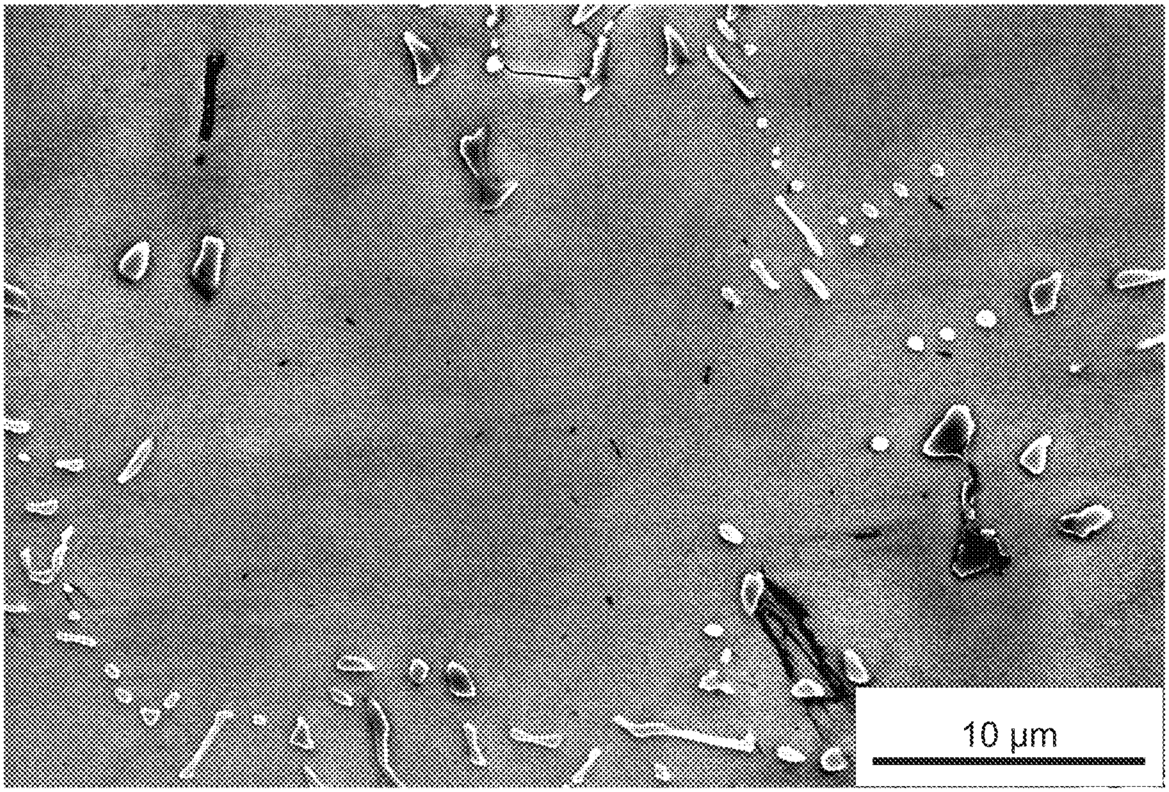
FIG. 15 is an SEM image of the alloy of Example 3.
Figure 16:
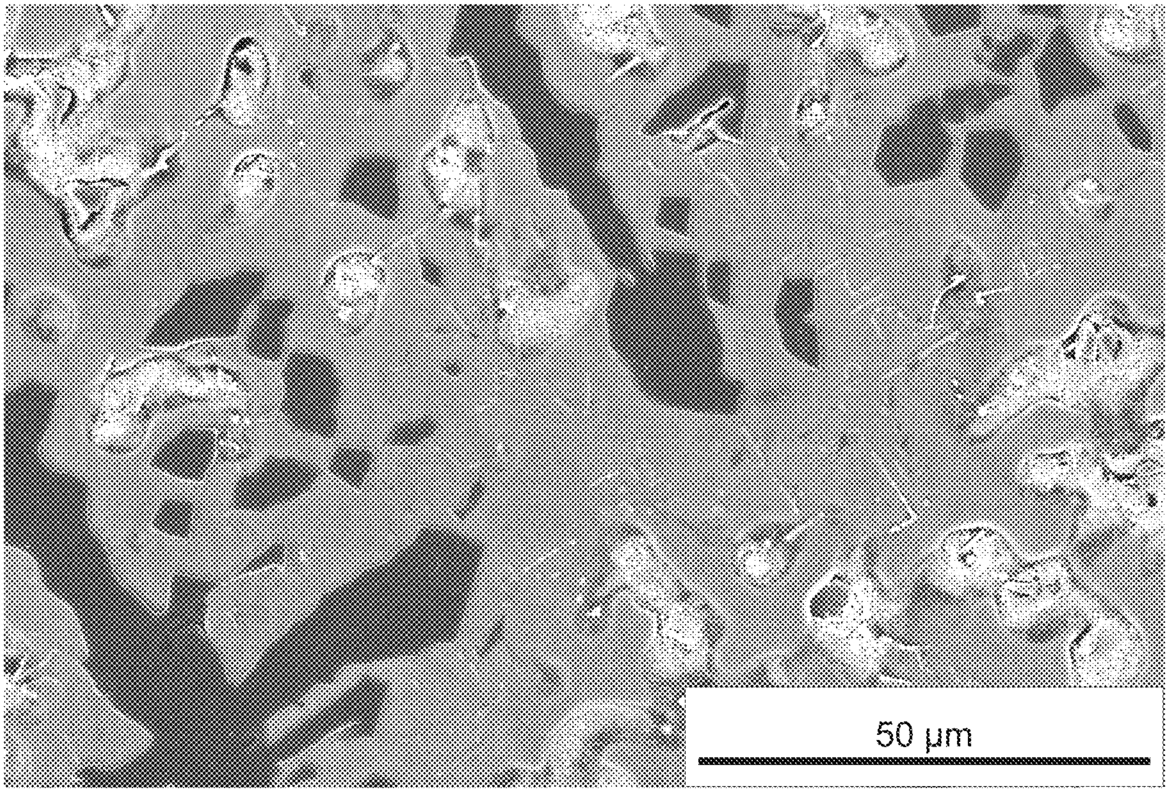
FIG. 16 is an SEM image of the alloy of Example 4.

As shown in FIGS. 4 to 7 and 10 to 16, the alloys of Examples 1 to 4 had a continuous phase 11 (light-colored portion) and a carbide phase 12 (dark-colored portion) dispersed in the continuous phase 11. Considering the above-described XRD measurement results, it is estimated that the continuous phase 11 had the FCC structure, and the carbide phase 12 had the NaCl structure. The equivalent circle diameters of the carbide phase 12 of the alloys of Examples 1 to 4 were each 50 μm or less, which was smaller than the average equivalent circle diameter of the carbide phase 22 (dark-colored portion in FIG. 8) in the WC—Co cemented carbide of the Comparative Example. In the higher magnification observation image (see FIG. 9) of the continuous phase 11 of the alloys of Examples 1 to 4, the presence of a white granular structure having an equivalent circle diameter of 10 nm to 20 nm suggested that the continuous phase 11 included a γ phase and a γ' phase.

(5) High-temperature Hardness Evaluation

A test piece of a predetermined shape was cut out from the alloy mass of each Example, and its hardness at 700° C. was measured. Specifically, using a high-temperature micro Vickers hardness testing system (AVK-HF) manufactured by Mitutoyo Corporation, a diamond indenter was pressed into each test piece heated to 700° C. with a load of 5 kg for 30 seconds, and the diagonal length of the indentation was measured. The measurement was carried out ten times, and the hardness of the alloy of each Example was calculated from the average value of the eight measured values, excluding the maximum and minimum values. Similarly, the hardness at 700° C. of the WC—Co cemented carbide of the Comparative Example was measured. Table 3 shows the results.

TABLE 3

| | Vickers hardness [HV] |
|---|---|
| Example 1 | 423 |
| Example 2 | 465 |
| Example 3 | 358 |
| Example 4 | 373 |
| Comparative Example | 276 |

It was confirmed that all of the alloys of Examples 1 to 4 had a higher hardness at 700° C. than the WC—Co cemented carbide-manufactured body of the Comparative Example.

(6) Crack Resistance Evaluation

A test piece of a predetermined shape was cut out from the alloy mass of each Example. Each test piece was irradiated with a laser beam under the conditions described below to melt and solidify. The test piece of the Comparative Example was also irradiated with a laser beam in the same manner to melt and solidify.

Laser Beam Irradiation Conditions

Laser beam irradiation device: 2 kW fiber laser
Laser beam output: 1600 W
Shielding gas: Ar
Laser beam incidence angle: 10°
Laser beam scanning width: 13 mm
Laser beam scanning speed: 500 mm/min Next, the presence or absence of cracks in each test piece after cooling was evaluated by penetrant testing. None of the test pieces of Examples 1 to 4 had any cracks. On the other hand, cracks were observed in the test piece of the Comparative Example. These results indicate that the alloys of Examples 1 to 4 are less likely to crack due to thermal stress during melting and solidification. This suggests that the alloys of Examples 1 to 4 have high resistance to thermal stress in additive manufacturing and are therefore less likely to crack. It is considered that one of the factors that resulted in the high crack resistance in Examples 1 to 4 is that a finer carbide phase was formed in Examples 1 to 4 as compared to the Comparative Example.

REFERENCE SIGNS LIST

1: Alloy layer; 2: Substrate; 3: Mixed layer; 4: Coating layer; 10: Composite member

CITATION LIST

Patent Literature

Patent Literature 1: Japanese Patent Publication No. 2017-501890
Patent Literature 2: WO 2021/201118

The invention claimed is:

1. An alloy comprising, in % by mass,

Cr at 10% to 20%,

C at 1.0% to 2.5%,

Ti at 3% to 8%, either or both of Nb and Ta at 8% to 15% in total,

B at less than 0.5%,

Al at 2% or less,

Mo at 8% or less,

W at 8% or less, wherein a total of Mo and W is less than 10%, and a balance comprising Ni and inevitable impurities, wherein a ratio of a total number of Ti, Nb, and Ta atoms to a number of C atoms is more than 1.5.

2. The alloy according to claim 1, comprising:

a continuous phase having a face-centered cubic lattice structure and including a $\gamma$ phase and a $\gamma'$ phase; and a carbide phase having a NaCl-type crystal structure and dispersed in the continuous phase.

3. The alloy according to claim 2, wherein the carbide phase has an average particle size of 50 μm or less.

4. An alloy member at least partially comprising the alloy according to claim 1.

5. A composite member comprising a substrate and a stacked alloy layer on the substrate, wherein the stacked alloy layer comprises the alloy according to claim 1.

6. A die comprising a substrate and a stacked alloy layer on the substrate, wherein the stacked layer comprises the alloy according to claim 1.

7. An alloy powder comprising, in % by mass,

Cr at 10% to 20%,

C at 1.0% to 2.5%,

Ti at 3% to 8%, either or both of Nb and Ta at 8% to 15% in total,

B at less than 0.5%,

Al at 2% or less,

Mo at 8% or less,

W at 8% or less, wherein a total of Mo and W is less than 10%, and a balance comprising Ni and inevitable impurities, wherein a ratio of a total number of Ti, Nb, and Ta atoms to a number of C atoms is more than 1.5.

8. The alloy powder according to claim 7, which is a granulated sintered powder.

9. The alloy powder according to claim 7, wherein the alloy powder has an average particle diameter $d_{50}$ of 5 μm to 500 μm, the average particle diameter $d_{50}$ corresponding to a particle diameter at a cumulative value of 50% by volume in a volume-based particle size distribution measured by a laser diffraction scattering method.

* * * * *